(12) United States Patent
Martin

(10) Patent No.: US 7,426,791 B2
(45) Date of Patent: Sep. 23, 2008

(54) ENERGY SAVING DEVICE FOR CLOTHES DRYER AND CLOTHES DRYER SYSTEM COMPRISING SAME

(76) Inventor: Mack V. Martin, 1220 Mackmartin Rd., Winnfield, LA (US) 71483

( * ) Notice: Subject to any disclaimer, the term of this patent is extended or adjusted under 35 U.S.C. 154(b) by 0 days.

(21) Appl. No.: 11/054,027

(22) Filed: Feb. 9, 2005

(65) Prior Publication Data

US 2007/0271809 A1 Nov. 29, 2007

(51) Int. Cl.
*F26B 21/10* (2006.01)
(52) U.S. Cl. .............................. 34/607; 34/566; 34/570; 34/608; 34/493; 34/487
(58) Field of Classification Search .................. 34/565, 34/566, 570, 571, 90, 604, 607, 608, 471, 34/493, 201, 202, 235, 86, 496, 497, 476, 34/475, 446; 432/62; 126/616, 629, 513, 126/522; 454/236
See application file for complete search history.

(56) References Cited

U.S. PATENT DOCUMENTS

| | | | | |
|---|---|---|---|---|
| 4,043,051 A | * | 8/1977 | Lussenden | ...................... 34/77 |
| 4,137,647 A | | 2/1979 | Clark, Jr. | |
| 4,279,082 A | * | 7/1981 | Commander | .................... 34/82 |
| 4,594,797 A | * | 6/1986 | Houck, Jr. | ..................... 34/225 |
| 6,640,461 B1 | | 11/2003 | Berger | |

\* cited by examiner

*Primary Examiner*—Kenneth B Rinehart
(74) *Attorney, Agent, or Firm*—Raymond M. Galasso; Galasso & Assoc. LP

(57) ABSTRACT

An energy savings apparatus configured for use with a clothes dryer comprising an air duct and a damper assembly. The air duct has a first end and a second end. The damper assembly includes an air duct portion and a damper device mounting on the duct portion. The air duct portion of the damper assembly is attached at a first end thereof to the first end of the air duct. The second end of the air duct portion of the damper assembly is configured for being attached to an air inlet of a heater assembly of a clothes dryer. The damper assembly is configured for selectively enabling air to be routed to the air inlet of the heater assembly from the second end of the air duct and from an air inlet intermediate the ends of the air duct portion of the damper assembly.

14 Claims, 2 Drawing Sheets

ENERGY SAVING DEVICE FOR CLOTHES DRYER AND CLOTHES DRYER SYSTEM COMPRISING SAME

FIELD OF THE DISCLOSURE

The disclosures made herein relate generally to clothes dryers and, more particularly, to energy saving devices for clothes dryers.

BACKGROUND

A clothes dryer works by heating clothes and aerating them through tumbling. In fact, the essence of a clothes dryer is to produce a lot of hot air and continually tumble clothes while exposing them to the hot air. Clearly, this functionality consumes considerable amounts of energy. So much energy that, in many homes, the clothes dryer is the number two consumer of energy—second only to the refrigerator. Because of its relatively high-energy usage, increasing the efficiency of a clothes dryer can dramatically reduce the associated costs of its operation as well as unnecessary waste of natural resources and energy production resources.

Intake air temperature at the heating assembly of a clothes dryer is one factor that determines how efficiently a dryer converts a unit of energy to a given unit of heat. Relatively cold intake air required more energy to heat to a given temperature than does relatively hot air. Similarly, as compared to relatively cold air, relatively hot air is heated to a higher temperature for a given amount of energy than is cold air for the same given amount of energy. The effect of intake air temperature on energy utilization illustrates why ingesting relatively cold air intake air (e.g., indoor air) at the heating assembly of a clothes dryer adversely affects efficiency and performance of the clothes dryer. Therefore, an apparatus that delivers relatively hot air to the heating assembly of a clothes dryer without an associated cost for delivering such heated air is useful and advantageous.

SUMMARY OF THE DISCLOSURE

An energy saving apparatus in accordance with the inventive disclosures made herein directs relatively hot attic air to a clothes for reducing energy consumption and increasing drying performance of the clothes dryer. To provide such energy savings, the apparatus is configured for being attached to and/or incorporated into a clothes dryer and is configured for enabling the dryer to selectively take in relatively hot air from an attic space rather than relatively cool indoor air. Generally speaking, typical indoor air of a climate-controlled environment is about 75° F. and, depending on the season and climate, attic air is often 115° F. or hotter. Ingestion of the relatively hot attic air rather than relatively cool indoor air reduces the amount of work required by a heating element of the clothes dryer and, correspondingly, the energy consumed by the clothes dryer to dry clothes.

At least a portion of the apparatus may be installed during construction of a new structure (e.g., a home) or it may be retrofitted into an existing home. Additionally, at least a portion of the apparatus may be incorporated into a clothes dryer by a manufacturer of the clothes dryer. For the DIY (i.e., do-it-yourself) market, the apparatus may be provided in the form of a DIY kit that is configured for being installed (e.g., retrofitted) by a homeowner or general contractor.

In one embodiment of the inventive disclosures made herein, an energy savings apparatus configured for use with a clothes dryer comprising an air duct and a damper assembly. The air duct has a first end and a second end. The damper assembly includes an air duct portion and a damper device mounting on the duct portion. The air duct portion of the damper assembly is attached at a first end thereof to the first end of the air duct. The second end of the air duct portion of the damper assembly is configured for being attached to an air inlet of a heater assembly of a clothes dryer. The damper assembly is configured for selectively enabling air to be routed to the air inlet of the heater assembly from the second end of the air duct and from an air inlet intermediate the ends of the air duct portion of the damper assembly.

In another embodiment of the inventive disclosures made herein, a kit configured for reducing energy consumption of a clothes dryer comprises an air duct and a damper assembly. The air duct has a first end and a second end. The damper assembly includes an air duct portion and a damper device mounting on the duct portion. The air duct portion of the damper assembly is configured for being attached at a first end thereof to the first end of the air duct. A second end of the air duct portion of the damper assembly is configured for being attached to an air inlet of a heater assembly of a clothes dryer. The damper assembly is configured for selectively enabling air to be routed to the air inlet of the heater assembly from the second end of the air duct and from an air inlet intermediate the ends of the air duct portion of the damper assembly.

In at least one embodiment of the inventive disclosures made herein, an electrically-powered blower unit is provided and has an air outlet attached to the second end of the air duct.

In at least one embodiment of the inventive disclosures made herein, the second end of the duct portion of the damper assembly includes an adapter configured for enabling the second end of the duct portion to be attached to the air inlet of the heater assembly of the clothes dryer.

In at least one embodiment of the inventive disclosures made herein, the damper assembly includes means for manually operating a damper device of the damper assembly. The means allows for air to be routed to the air inlet of the heater assembly of the clothes dryer from the second end of the air duct when the means in a first position and for air to be routed to the air inlet of the heater assembly through the intermediate air inlet when the means is in the second position.

In at least one embodiment of the inventive disclosures made herein, a control system is attached to a damper device of the damper assembly. The control system is configured for sensing air temperature, for moving the damper device to a first position when a temperature at or above a prescribed level is sensed and for moving the damper device to a second position when a temperature below the prescribed level is sensed.

In at least one embodiment of the inventive disclosures made herein, air is routed to the air inlet of the heater assembly of the clothes dryer from the second end of the air duct when the damper device is in a first position and is routed to the air inlet of the heater assembly of the clothes dryer from the intermediate air inlet when the damper device is in the second position.

In at least one embodiment of the inventive disclosures made herein, the control system includes a temperature-sensing device attached to the air duct adjacent the second end of the air duct.

In at least one embodiment of the inventive disclosures made herein, the temperature-sensing device and the air duct are jointly configured for enabling the temperature-sensing device to be attached to the air duct adjacent the second end of the air duct.

These and other objects and embodiments of the inventive disclosures made herein will become readily apparent upon further review of the following specification and associated drawings.

DETAILED DESCRIPTION OF THE DRAWINGS

Figure 1:
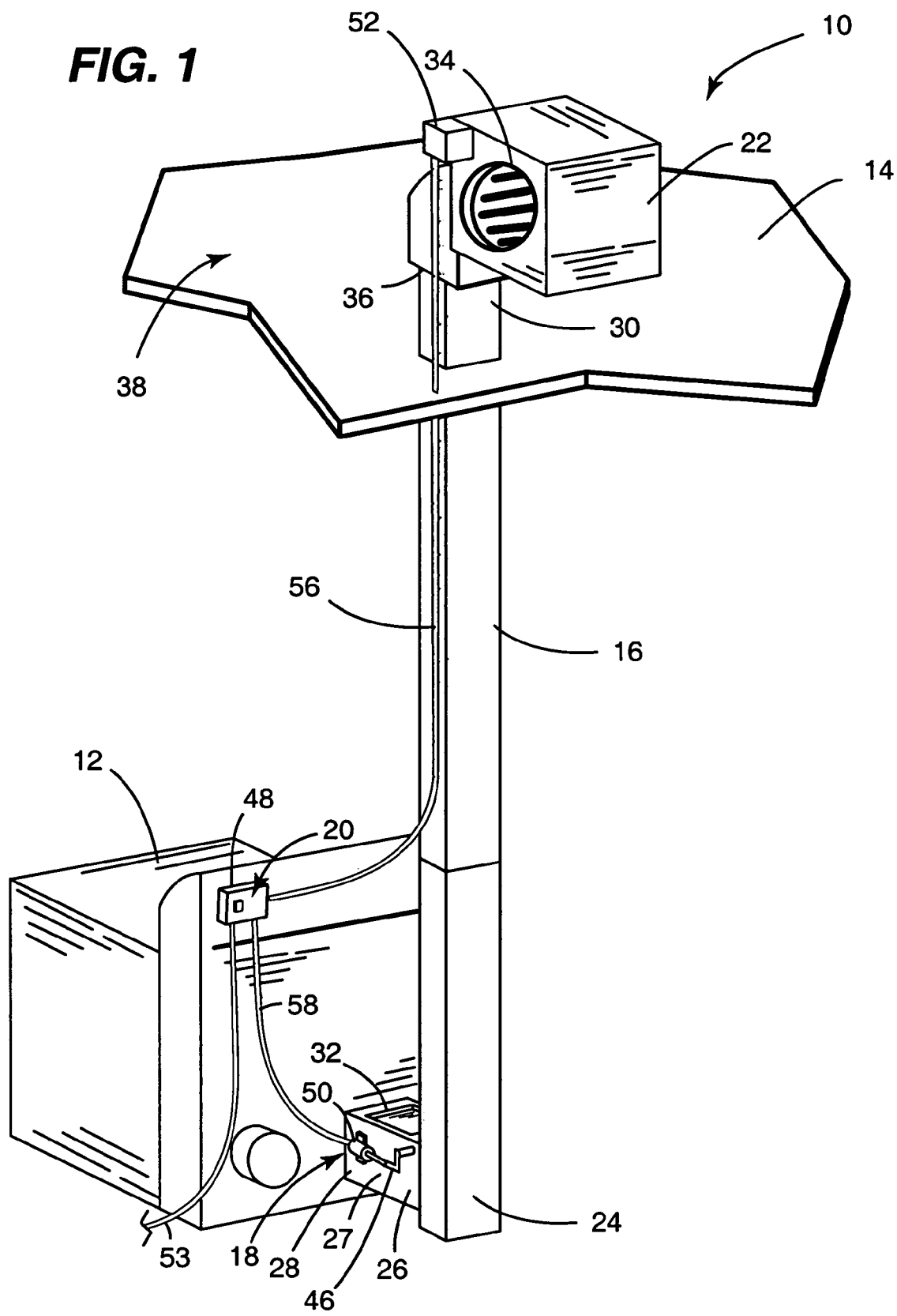
FIG. 1 depicts an embodiment of an energy-savings apparatus in accordance with the inventive disclosures made herein.

FIG. 1 depicts an embodiment of an energy-savings apparatus in accordance with the inventive disclosures made herein. The energy-saving apparatus is referred to generally by reference numeral 10 (i.e., the energy-saving apparatus 10) and excludes the clothes dryer 12 and ceiling 14. The energy-saving apparatus 10 is configured for use with the clothes dryer 12 and for reducing energy consumption associated the clothes dryer 12 performing the operation of drying clothes.

The energy-saving apparatus 10 includes an air duct 16, a damper assembly 18, a control system 20 and an electrically-powered blower unit 22. The air duct 16 has a first end 24 attached to a first end 26 of an air duct portion 27 of the damper assembly 18. A second end 28 of the air duct portion 27 of the damper assembly 18 is attached to an air inlet of a heater assembly (not specifically shown) of the clothes dryer 12. Preferably, but not necessarily, the second end 28 of the air duct portion 27 the damper assembly 18 includes an adapter (e.g., an integral adapter) configured for enabling the second end 28 of the air duct portion 27 of the damper assembly 18 to be attached to the air inlet of the heater assembly of the clothes dryer 12. As will be discussed below in more detail in reference to FIG. 2, the damper assembly 18 is configured for selectively enabling air to be routed to the air inlet of the heater assembly from a second end 30 of the air duct 16 and from an air inlet 32 intermediate the ends of the air duct portion 27 of the damper assembly 18 (i.e., the intermediate air inlet 32).

Depending on the type of installation of the apparatus 10 (e.g., new construction or retrofit), the configuration of the apparatus 10 and the resources (e.g., financial resources) available for installing the apparatus 10, the air duct 16 may be located within the walls of a structure or exterior to the walls of the structure. Similarly, the type of installation of the apparatus 10, the configuration of the apparatus 10 and the resources available for installing the apparatus 10 will dictate whether the damper assembly is situated vertically, horizontally, within a wall, exterior to a wall, or even intermediate between the first end 24 and the second end 30 of the air duct 16.

The blower unit 22 has an air inlet 34 and an air outlet 36. The air outlet 36 of the blower unit 22 is attached to the second end 30 of the air duct 16. The blower unit 22 is configured for being mounted in an attic space 38 of a building. When activated (i.e., energized), the blower unit 22 draws air from within the attic space 38 through the air inlet 34 and forcibly blows such air into the air duct 16 through the second end 30 of the air duct 16.

Figure 2:
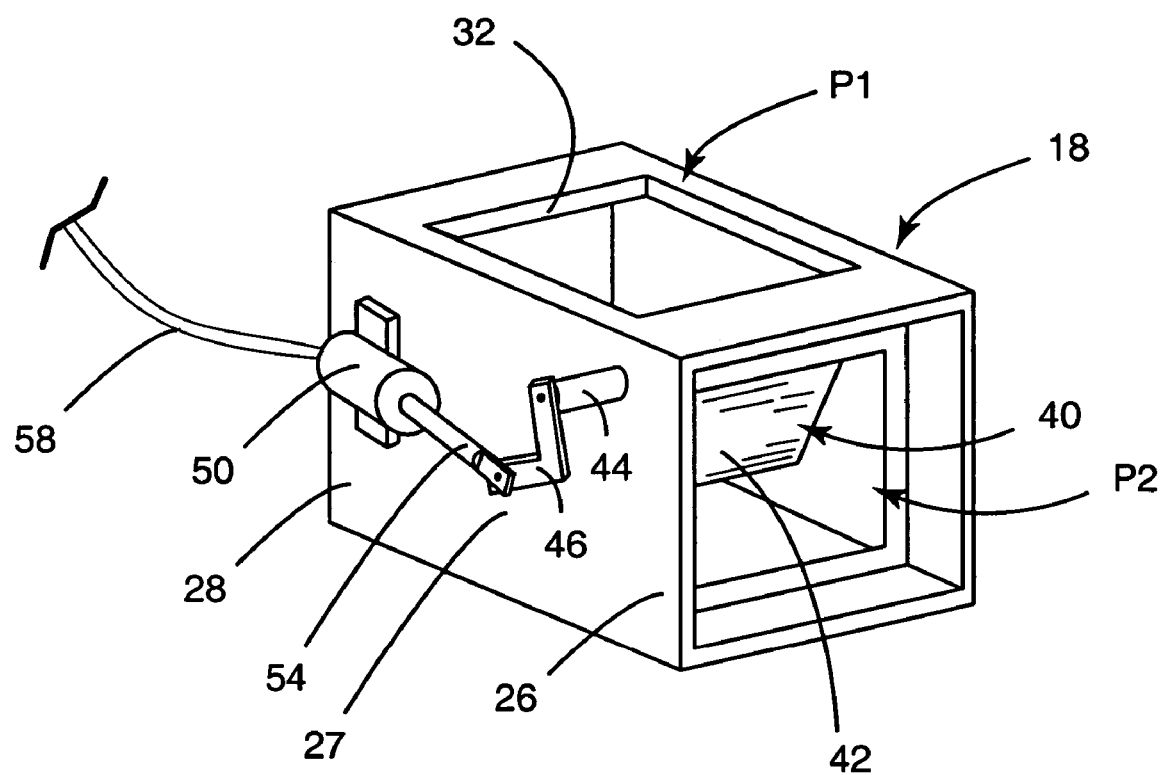
FIG. 2 depicts an embodiment of a damper assembly in accordance with the inventive disclosures made herein and as integrated into the energy savings apparatus depicted in FIG. 1.

Referring now to FIGS. 1 and 2, the damper assembly 18 includes a damper device configured for controlling the routing of air through the air duct portion 27 of the damper assembly 18 (i.e., from where airflow into the duct portion 27 is supplied). The damper device is referred to generally by reference numeral 40 (i.e., the damper device 40). The damper device 40 includes a damper member 42, a shaft 44 attached to the damper member 42 and a J-arm 46 attached to an end of the shaft 44. The shaft 44 is pivotally mounted on the air duct portion 27 of the damper assembly 18 for enabling the damper device 40 to be moved between a first position P1 and a second position P2. When the damper device 40 is in the first position P1, the damper member 42 is engaged over the intermediate air inlet 32 of the air duct portion 27, thereby limiting airflow through the intermediate air inlet 32 and promoting airflow through the first end 26 of the air duct portion 27. When the damper device 40 is in the second position P2, the damper member 42 is substantially blocking off the first end 26 of the air duct portion 27 of the damper assembly 18, thereby limiting airflow through the first end 26 of the air duct portion 27 (i.e., limiting air inlet through the second end 30 of the air duct 16) and promoting airflow through the intermediate air inlet 32.

The control system 20 includes a controller 48, a damper actuator 50, a thermostatic switch assembly 52 and various cables for distributing power and/or signals. A power cord 53 supplies power (i.e., standard 110V line voltage) to the controller 48 and the controller distributes such power accordingly to the thermostatic switch assembly 52, the blower unit 22 and/or the damper actuator 50. A blower unit cable 56 is preferably connected between the controller 48 and the thermostatic switch assembly 52 for enabling power to be provided to the blower unit 22 and for a signal corresponding to the attic air temperature being provided to the controller 48. A damper device cable 58 is connected between the controller 48 and the damper actuator 50 for enabling power to be provided to the damper actuator 50 from the controller 48.

In one embodiment, a temperature-sensing device (e.g., a sensor) integral with the thermostatic switch assembly 52 provides the signal corresponding to the attic air temperature. In another embodiment (not specifically shown), the temperature sensor is attached to the air duct 16 adjacent the second end 30 of the air duct 16. For example, the temperature-sensing device and the air duct 16 may be jointly configured for enabling the temperature-sensing device to be attached to the air duct 16 adjacent the second end 30 of the air duct 16.

The damper actuator 50 is mounted on an exterior surface of the air duct portion 27 of the damper assembly 18 and has a movable actuation member 54 attached to the J-arm 46 of the damper device 40, whereby the damper actuator 50 is configured for moving the damper device 40 between the first position P1 and the second position P2. Examples of the damper actuator 50 include, but are not limited to, a solenoid and a servo. The thermostatic switch assembly 52 is configured for enabling power to be supplied to the blower unit 22 (e.g., a relay for supplying power to the blower unit 22) and for providing a signal that corresponds to the attic air temperature to the controller 48.

The controller 48 is configured for activating the blower unit 22 and moving the damper device 40 from the second position P2 to the first position P1 when the clothes dryer 12 is in operation and the attic air temperature is at or above a prescribed temperature. In one embodiment, the controller 48 includes digital and/or solid state circuitry and corresponding logic for providing such blower activation and damper movement functionalities. Alternately, the controller 48 includes one or more switches and/or relays.

The controller 48 facilitates the damper actuator 50 moving the damper device 40 to the first position P1 and activating the blower unit 22 when a first temperature condition is sensed for the attic air (i.e., the attic air temperature at or above a prescribed temperature) and for moving the damper device 40 to the second position P1 (or enabling it to be biased back to the second position P2) and deactivating the blower unit 22 when a second temperature condition is sensed for the attic air (i.e., the attic air temperature being below the prescribed temperature). Although not specifically depicted, it is disclosed herein that the controller system 20 preferably, but not necessarily, only provides its functionality when the clothes dryer is in operation. It is also disclosed herein that the damper device 40 is preferably, but not necessarily, biased to the second position P2 when the clothes dryer 12 is not in operation and/or when the damper actuator is not energized.

In operation, when the clothes dryer 12 is in operation and the first temperature condition is sensed, attic air is routed to the air inlet of the heater assembly of the clothes dryer 12 from the second end 30 of the air duct (i.e., the damper device 40 is in the first position P1). In this manner, pre-heated air is provided to the heater assembly, thus enabling the air heated by the heater assembly to be heated more efficiently and with less energy. When the clothes dryer 12 is in operation and the second temperature condition is sensed, indoor air (i.e., air within the room where the clothes dryer 12 is located) is routed to the air inlet of the heater assembly of the clothes dryer 12 from the intermediate air inlet 32 of the damper assembly 18. In this manner, the clothes dryer operates in a generally standard fashion (e.g., drawing in and heating indoor room air).

The control system 20 depicted in FIGS. 1 and 2 is one embodiment of a means for operating the damper device 40 of the damper assembly 18. In an alternate embodiment (not specifically shown), the control system 20 is configured for enabling blower unit and damper advice functionality to be implemented via an activation switch (i.e., moving the switch from an off position to an on position results in the blower unit 22 turning on and the damper device 40 moving from the second position P2 to the first position P1. In an alternate embodiment (not specifically shown), the control system 20 and the blower unit 22 are omitted (i.e., blower of heater assembly generates airflow through air duct 16 and damper assembly 18) and means for manually controlling routing of air through the air duct 16 and damper assembly 18 is provided. One example of such manual means is a hand-operated control mechanism (e.g., a lever with linkage) connected to the damper device 40 (e.g., to the J-arm 46) for enabling the damper device 40 to be manually moved between first position P1 and the second position P2.

FIG. 1 depicts an embodiment of an apparatus (i.e., assembled components, assemblies, devices, systems, etc) configured for facilitating energy-saving functionality in accordance with the inventive disclosures made herein. In another embodiment of the inventive disclosures made herein, a kit is provided for enabling such energy-saving functionality to be facilitated. The kit comprises the components, assemblies, devices, systems, etc of the apparatus 12 in a fully and/or partially disassembled format and in a configuration for enabling such components, assemblies, devices, systems, etc. to be interconnected accordingly for enabling such energy-saving functionality to be facilitated.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice embodiments of the inventive disclosures made herein. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An energy savings apparatus configured for use with a clothes dryer, comprising:
   an air duct having a first end and a second end;
   a damper assembly including an air duct portion and a damper device mounting on the air duct portion, wherein the air duct portion of the damper assembly is attached at a first end thereof to the first end of the air duct, wherein a second end of the air duct portion of the damper assembly is configured for being attached to an air inlet of a heater assembly of a clothes dryer and for selectively enabling air to be routed to the air inlet of the heater assembly from the second end of the air duct and from an air inlet intermediate said ends of the air duct portion of the damper assembly; and
   an electrically-powered blower unit having an air outlet attached to the second end of the air duct; and
   a control system attached to a damper device of the damper assembly and to the blower unit; wherein:
      the damper assembly includes an adapter configured for enabling the second end of the air duct portion of the damper assembly to be attached to the air inlet of the heater assembly of the clothes dryer;
      the control system includes a temperature-sensing device attached to the air duct adjacent the second end of the air duct;
      the control system is configured for moving the damper device to a first position and activating the blower unit when a first temperature condition is sensed and for moving the damper device to a second position and deactivating the blower unit when a second temperature condition is sensed;
      air is routed to the air inlet of the heater assembly of the clothes dryer from the second end of the air duct when the damper device is in a first position;
      air is routed to the air inlet of the heater assembly of the clothes dryer from said intermediate air inlet when the damper device is in the second position;
      the first temperature condition is a temperature at or above a prescribed level; and
      the second temperature condition is a temperature below the prescribed level.

2. The energy savings apparatus of claim 1 wherein the second end of the air duct portion the damper assembly includes an adapter configured for enabling the second end of the air duct portion of the damper assembly to be attached to the air inlet of the heater assembly of the clothes dryer.

3. The energy savings apparatus of claim 1 wherein:
   the damper assembly includes means for manually operating a damper device of the damper assembly; and
   said means allows air to be routed to the air inlet of the heater assembly of the clothes dryer from the second end of the air duct when said means in a first position; and
   said means allows air to be routed to the air inlet of the heater assembly through said intermediate air inlet when said means is in the second position.

4. The energy savings apparatus of claim 1, further comprising:
a control system attached to a damper device of the damper assembly, wherein the control system is configured for sensing air temperature and wherein the control system is configured for moving the damper device to a first position when a first temperature condition is sensed and for moving the damper device to a second position when a second temperature condition is sensed.

5. The energy savings device of claim 4 wherein:
air is routed to the air inlet of the heater assembly of the clothes dryer from the second end of the air duct when the damper device is in a first position;
air is routed to the air inlet of the heater assembly of the clothes dryer from said intermediate air inlet when the damper device is in the second position;
the first temperature condition is a temperature at or above a prescribed level; and
the second temperature condition is a temperature below the prescribed level.

6. The energy savings apparatus of claim 5 wherein:
the control system includes a temperature-sensing device attached to the air duct adjacent the second end of the air duct.

7. The energy savings apparatus of claim 1 wherein the temperature-sensing device and the air duct are jointly configured for enabling the temperature-sensing device to be attached to the air duct adjacent the second end of the air duct.

8. A kit configured for reducing energy consumption of a clothes dryer, comprising:
an air duct having a first end and a second end;
a damper assembly including an air duct portion and a damper device mounting on the duct portion, wherein the air duct portion of the damper assembly is configured for being attached at a first end thereof to the first end of the air duct, wherein a second end of the air duct portion of the damper assembly is configured for being attached to an air inlet of a heater assembly of a clothes dryer and for selectively enabling air to be routed to the air inlet of the heater assembly from the second end of the air duct and from an air inlet intermediate said ends of the air duct portion of the damper assembly; and
an electrically-powered blower unit having an air outlet configured for being attached to the second end of the air duct; and
a control system configured for being attached to a damper device of the damper assembly and to the blower unit; wherein:
the damper assembly includes an adapter configured for enabling the second end of the air duct portion of the damper assembly to be attached to the air inlet of the heater assembly of the clothes dryer;
the control system includes a temperature-sensing device attached to the air duct adjacent the second end of the air duct;
the control system is configured for moving the damper device to a first position and activating the blower unit when a first temperature condition is sensed and for moving the damper device to a second position and deactivating the blower unit when a second temperature condition is sensed;
air is routed to the air inlet of the heater assembly of the clothes dryer from the second end of the air duct when the damper device is in a first position;
air is routed to the air inlet of the heater assembly of the clothes dryer from said intermediate air inlet when the damper device is in the second position;
the first temperature condition is a temperature at or above a prescribed level; and
the second temperature condition is a temperature below the prescribed level.

9. The kit of claim 8 wherein the damper assembly includes an adapter configured for enabling the second end of the air duct portion of the damper assembly to be attached to the air inlet of the heater assembly of the clothes dryer.

10. The kit of claim 8 wherein:
the damper assembly includes means for manually operating a damper device of the damper assembly; and
said means allows air to be routed to the air inlet of the heater assembly of the clothes dryer from the second end of the air duct when said means in a first position; and
said means allows air to be routed to the air inlet of the heater assembly through said intermediate air inlet when said means is in the second position.

11. The kit of claim 8, further comprising:
a control system configured for being attached to a damper device of the damper assembly, wherein the control system is configured for sensing air temperature and wherein the control system is configured for moving the damper device to a first position when a first temperature condition is sensed and for moving the damper device to a second position when a second temperature condition is sensed.

12. The kit of claim 11 wherein:
air is routed to the air inlet of the heater assembly of the clothes dryer from the second end of the air duct when the damper device is in a first position;
air is routed to the air inlet of the heater assembly of the clothes dryer from said intermediate air inlet when the damper device is in the second position;
the first temperature condition is a temperature at or above a prescribed level; and
the second temperature condition is a temperature below the prescribed level.

13. The kit of claim 12 wherein:
the control system includes a temperature-sensing device; and
the temperature-sensing device and the air duct are jointly configured for enabling the temperature-sensing device to be attached to the air duct adjacent the second end of the air duct.

14. The kit of claim 8 wherein the temperature-sensing device and the air duct are jointly configured for enabling the temperature-sensing device to be attached to the air duct adjacent the second end of the air duct.

* * * * *